United States Patent [19]

Cox et al.

[11] Patent Number: 5,018,815
[45] Date of Patent: May 28, 1991

[54] FIBRE OPTIC DATA NETWORK

[75] Inventors: Eric R. Cox, Chester; Philippe J. C. Leliaert, Runcorn, both of England

[73] Assignee: Imperial Chemical Industries PLC, London, England

[21] Appl. No.: 449,344

[22] Filed: Dec. 5, 1989

Related U.S. Application Data

[63] Continuation of Ser. No. 824,864, Jan. 31, 1986, abandoned, which is a continuation-in-part of Ser. No. 744,270, Jun. 13, 1985, abandoned.

[30] Foreign Application Priority Data

Jan. 31, 1985 [GB] United Kingdom ................. 8502451
Jun. 10, 1985 [EP] European Pat. Off. ......... 85304096.2

[51] Int. Cl.⁵ .......................... G02B 6/26; G02B 6/42
[52] U.S. Cl. ................. 350/96.15; 350/96.16
[58] Field of Search ........................... 350/96.15, 96.16

[56] References Cited

U.S. PATENT DOCUMENTS

| | | | |
|---|---|---|---|
| 4,054,366 | 10/1977 | Barnoski et al. | 350/96.15 |
| 4,294,513 | 10/1981 | Nelson et al. | 350/96.15 |
| 4,307,933 | 12/1981 | Palmer et al. | 350/96.15 |
| 4,431,260 | 2/1984 | Palmer . | |
| 4,440,498 | 4/1984 | Sheem | 350/96.15 |
| 4,449,043 | 5/1984 | Husbands | 350/96.15 |
| 4,557,550 | 12/1985 | Beals et al. | 350/96.16 |
| 4,577,924 | 3/1986 | Mathis | 350/96.15 |
| 4,616,898 | 10/1986 | Hicks | 350/96.15 |
| 4,622,663 | 11/1986 | Ishikawa et al. | 350/96.15 |
| 4,676,584 | 6/1987 | Perlin | 350/96.15 |
| 4,697,876 | 10/1987 | Dyott | 350/96.15 |

FOREIGN PATENT DOCUMENTS

| | | |
|---|---|---|
| 080815 | 6/1983 | European Pat. Off. . |
| 0166550 | 1/1986 | European Pat. Off. . |
| 4923643 | 3/1974 | Japan . |
| 5217836 | 2/1977 | Japan . |
| 2040493 | 8/1980 | United Kingdom . |
| 1590082 | 5/1981 | United Kingdom . |

Primary Examiner—William L. Sikes
Assistant Examiner—Robert E. Wise
Attorney, Agent, or Firm—Cushman, Darby & Cushman

[57] ABSTRACT

A fibre optic data network comprises a plurality of optical fibres and a plurality of coupling devices associated with the fibres to couple them optically into the network configuration, each coupling device comprising means to hold an intermediate portion of a first fibre and to conform it to a predetermined path which executes a bend having a radius of curvature sufficiently small to cause some of any light flowing through the first fibre to leak from the cladding around the outer edge of the bend, and means to hold at least one further fibre with a light receptive portion positioned to receive at least a portion of the light leaking from the cladding around the outer edge of the bend. The couplings can be made in a non-invasive manner with even the cladding of the first fibre remaining intact. This enables networks to be restructured readily without signal degradation, and even allows some data bus configurations to be coupled to without interruption of service to other users.

9 Claims, 4 Drawing Sheets

FIBRE OPTIC DATA NETWORK

This is a continuation of application Ser. No. 06/824,864, filed Jan. 31, 1986, which was abandoned upon the filing hereof, which, in turn, is a continuation-in-part of Ser. No. 744,270, filed June 13, 1985, and now abandoned.

RELATED APPLICATIONS

This application relates to and claims the benefit of Applicants prior to U.K. Application No. 85/02451 and European Application No. 85.304096.2 as filed on Jan. 31, 1985 and June 10, 1985, respectively.

The invention relates to optical communication, and in particular to fibre optic data networks for transferring information optically between a plurality of optical transmitting and receiving instruments.

Information can be transmitted as an encoded optical signal in various ways depending on the complexities of the information. Simple messages can be conveyed by simple on/off modulation or colour changes, e.g. as used in machine control panels, and more complex information can be conveyed in digital form as a sequence of light pulses. Such messages can be conveyed to single receiving stations by transmitting them along individual optical fibres linking transmitter and receiver directly, or they can be conveyed between a plurality of transmitters and receivers as multiplexed signals using a network of optical fibres, as found for example in optical forms of cable TV distribution, computer data links and telephone networks. Thus the optical instruments which can be linked by fibre optic networks can have widely differing functions, and include, for example, sensors for monitoring various chemical and physical parameters, control panel displays and warning lights, and computer terminals and communications transmitter and receiver stations having optoelectric interfaces with the fibre optic network.

Like their electrical counterparts, optical fibre networks require optical couplings to be made between fibres to enable the messages they carry to be transferred from one fibre to another. However, unlike the ease with which electrical cables can be connected, optical fibre ends conventionally need very precise alignment, both laterally and angularly, to enable light to pass efficiently from one fibre to the other. Considerable attenuation can also occur at each and every fibre end face so that the total losses at conventional interfibre couplings can severely limit the total number of such couplings that can be used in any network (without resorting to powered repeater stations or other means for enhancing a weak signal). Another serious disadvantage of conventional fibre optic networks when compared with their electrical counterparts lies in the difficulties in reconfiguring such networks, the traditional invasive couplers leaving fibre end faces to contribute to the overall loss of signal at each redundant coupler position.

According to the present invention an improved fibre optic data network comprises a plurality of optical fibres and a plurality of coupling devices associated with the fibres to couple them optically into the network configuration, each coupling device comprising means to hold an intermediate portion of a first fibre and to conform it to a predetermined path which executes a bend having a radius of curvature sufficiently small to cause some of any light flowing through the first fibre to leak from the cladding around the outer edge of the bend, and means to hold at least one further fibre with a light receptive portion positioned to receive at least a portion of the light leaking from the cladding around the outer edge of the bend.

We find that by bending the first fibre sufficiently to obtain a substantial leakage of light (determinable by measuring the accompanying decrease in the amount of light transmitted) by clamping or otherwise securing the two fibres accurately in predetermined positions, very reproducible proportions of light in the first fibre can be bled into the further fibre. Morever, these coupling devices can be made to achieve such reproducibility with very high efficiencies, and, as the technique is non-invasive, the first fibre remains continuous throughout its passage therethrough with no more preparation required than removal of a small area of any protective layers it may have (but not of cladding). This can be achieved by factory floor mechanics without specialist fibre optic skills, and can be achieved without any residual damage to the optical fibre. Thus by selecting which fibres shall be the said first fibres, i.e. bent fibres, and which shall be the further fibres according to the requirements of each application, considerable useful reconfiguration of the network can be achievable, as will be explained in more detail below.

Most fibre optic networks can be built up from one or more elements comprising a main fibre with a plurality of tap fibres extending from it, each to enable a transmitting and/or receiving instrument to be connected to the main fibre. For example, a single main fibre can provide a data bus along which signals can travel in one or both directions between tap fibres, or pairs of main fibres in parallel can provide data buses to be linked by instruments such as sensors, connected to the data buses via the tap fibres. Such data buses can usefully be in the configurations of an open loop with a single instrument, e.g. a central processing unit or data file, bridging the open end and communicating with a plurality of work stations or other instruments optically coupled to the data bus loop via the tap fibres; or as a closed loop with both transmitters and receivers connected via tap fibres. A useful alternative network configuration is a star network comprising a plurality of such elements radiating from a central passive star coupler or active hub. These are brief examples of configurations readily produced from such elements, specific examples being described in more detail below, and is not intended to be an exhaustive list. Such a versatile element represents a preferred configuration of the present networks. However in the present networks, such an element can have its main fibre formed from a plurality of separate fibres coupled together, or from a single continuous fibre, depending on the orientation of the coupling device in respect of its ports from which the main fibre emerges. Accordingly such an element of configuration will be described herein as an optical data bus having tap fibres extending from it, to avoid "main fibre" implying a continuous fibre when that may not necessarily be intended.

In accordance with the above, one of our preferred networks contains at least one element consisting essentially of a plurality of the fibres each of which is associated with a first coupling device as the said first fibre and with a second coupling device as a said further fibre, thereby to provide a network configuration comPrising an optical data bus (made up of intercoupled portions of each fibre) with a plurality of tap fibres (the remaining portions) extending from the data bus.

In the above preferred network, each fibre is bent around a suitable former in the coupling device. One part of the fibre forms a portion of the data bus while the other part emerges from the coupling device, after the bend, as a tap fibre. Where it passes round the bend, a portion of any light travelling along the fibre will leak from the fibre, to be caught by the next fibre forming the adjacent portion of the data bus. If a fibre is removed from the coupling device which holds it in a bent configuration, the data bus becomes broken, and the tap fibre can be allowed to straighten until it becomes just a terminal extension of the data bus. By reversing these procedures the fibre may be formed into a bend again within the coupling device, though not necessarily the same part of the fibre, and then be rejoined to the remainder of the data bus. Similarly a further tap fibre can be introduced into the data bus by adding a further length of data bus together with its attendant tap fibre and associated coupling device. Indeed with this configuration the network can be restructured by inserting several additional taps at intermediate positions even when there are closely spaced tap fibres already present, as this system lengthens the data bus with each additional tap at least by as much as may be required to make room for the further taps. A particular advantage of this system over invasively coupled sections is that removal of one or more units from the network does not leave light-leaking scars on the fibres that are retained, because the cladding remains intact. Hence on straightening the fibre after removal of the coupler, the only permanent damage should be to the protective sheath and not to the optical waveguide itself.

However for other applications it may be more convenient to install a permanent or semi-permanent optical data bus, and to couple tap fibres to this when and where required. Accordingly, an alternative preferred network is one wherein the first fibre has a plurality of further fibres each optically coupled to it by a separate one of the said coupling devices, again to provide a network configuration of an optical data bus with a plurality of tap fibres extending from it. As described above for the first preferred alternative network configuration, the non-invasive manner in which light can be tapped from the bent fibre without damaging either its core or its cladding, enables the network to be repeatedly restructured without degradation of the first fibre, in this case the data bus. Thus as a practical application we find that a data bus of this kind can be installed around a room having a plurality of work stations optically coupled by the data bus to each other or to a common apparatus. For example, a secretarial bureaux with several word processors can be linked to a common printer in this manner, and further word processors may be coupled to the data bus from time to time, or subsequently decoupled from it, without degradation of the data bus.

A simple coupling device which can be used in the present network is one which optically couples a first fibre held in a bend configuration to enable light to escape from it or to be received by it through the cladding, and a further fibre whose light receptive portion is in the form of an exposed end face held adjacent to the outer surface of the bend in the first fibre to enable it to receive light leaking from the bend when light is passed through the first fibre.

Such a coupling device can readily be constructed as a directional three port device, i.e. a coupling device from which three fibres emerge, two of which are portions of the same fibre, the said first fibre of the present networks, the other being the said further fibre. To provide such directional coupling properties, this three port device is preferably proportioned such that when light travelling through the first fibre approaches the bend along a first axis, the end portion of the further fibre is held along a second axis approximately parallel to the first axis (e.g. ±20), but displaced from the first axis in the same direction as the bend in the first fibre. This displacement is preferably small, i.e. less than the diameter of the first fibre. The further fibre will then normally only receive light from the first fibre when that light has travelled along the first fibre towards the bend along said first axis and not from the other direction. When the axes are displaced in this manner, we prefer the exposed end face to be set at an acute angle to the main axis of the tape fibre it terminates, preferably within the range 15° to 35°. These variable parameters, i.e. end face angle, axis displacement and interaxis angle, are all interrelated in their effects on the efficiency of the device, and the selection of specific values for each will affect the optimum values for the other two. Further details of specific three port coupling devices that can be used in the present networks are described in our copending European Application 166550 which specifically discloses, inter alia, an integral stripping blade operable for sliding along a mating surface during assembly of the coupler to strip a protective sheath from the first fibre around the bend and thereby exposing the underlying cladding.

A particularly useful coupling device for use in the present networks is a directional four port analogue of the above, comprising means to hold two of said further fibres with their exposed end faces adjacent to the outer surface of the bend in the first fibre but positioned substantially symmetrically with respect to said bend thereby to enable each of said further fibres to receive light travelling along the first fibre in the opposite direction to that received by the other of said further fibres. Light injected through the two further fibres would likewise be caused to travel along the first fibre in opposite directions, and light injected by one would travel along the first fibre in the same direction as light which can be accessed by the other. Such a device thus provides a very convenient way of coupling a communications station into a data bus communications link via the two tap fibres, providing a detector connected by one tap fibre and a source (with its attendant modulator) connected to the other.

It is not essential to use a fibre having a preformed light- receiving portion, as this can be formed in situ in non-invasive manner by bending an intermediate portion of a single further fibre in essentially the same manner as the first fibre. This can be achieved in a device which is designed to cause an intermediate portion of the further fibre to conform to a predetermined path which executes a bend having a radius of curvature sufficiently small to cause some of any light flowing through the fibre to leak from the cladding around the outer edge of the bend, and to hold adjacent to each other the outer edges of the bends in the two fibres whereby light leaked from one fibre can be caught by the other. As may be realised, in such a configuration there need be no asymmetry to identify either fibre as the first fibre on the other as the further fibre.

The amount of light which is caused to leak through the cladding of the main fibre depends on the radius of curvature of the bend, the smaller the radius of curvature the greater is the amount of light leaked. For example, for dividing the light into two equal parts, the radius of curvature may typically, be only about 2 mm, and it is desirable to use such devices with optical fibres which do not degrade through stress cracking under such circumstances. In general, therefore, we prefer to use such coupling devices with polymer fibres (e.g. clad polymethylmethacrylate fibres) rather than glass fibres, although some glass. fibres seem to withstand such bending successfully. It is also desirable to use the same kind of material for all fibres passing into or through a coupling device. We therefore prefer optical data networks in which both the first fibre and one or more further fibres passing through each coupling device are polymer optical fibres.

Polymer optical fibre networks are particularly suitable and convenient for local area networks where their fibre lengths can be kept reasonably short to avoid unually high light losses. For longer distances e.g. between local area networks, glass fibres are at present preferred. However, when a polymer optical fibre network is linked to at least one other such network by one or more optical fibres which are other than polymer optical fibres, the one or more linking fibres are preferably coupled to the polymer optical fibre networks using active interfaces.

The invention is illustrated by reference to specific embodiments shown in the drawings, in which FIGS. 1-4 show various arrangements of juxtaposed first and further fibres, positioned as they would be held in appropriate three and four port coupling devices within the present networks, FIGS. 1a–4a and 1b are diagrammatic representations of three and four port coupling devices forming parts of the present networks and having fibre configurations corresponding to those shown in FIGS. 1-4, FIG. 5 shows a single bidirectional data bus with tap fibres coupled to the data bus with three port coupling devices illustrated in FIG. 1, FIG. 6 shows a communications network comprising a single closed loop data bus coupled to tap fibres by four port coupling devices of FIG. 2, FIG. 7 shows an alternative communications network comprising parallel data buses to give a bidirectional system, and FIG. 8 shows how a plurality of individual open loop networks can communicate via an intercoupling further network.

Figure 1:
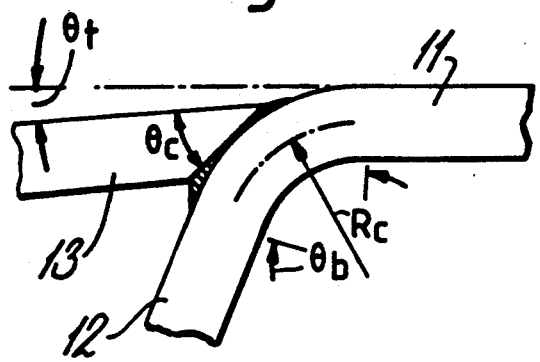

FIG. 1 shows a first fibre 11, 12 and a single further fibre 13, held as described above, and showing variable parameters which can be preselected, according to the configuration of the coupling device, to provide the desired characteristics, e.g. a 1/1 splitter or a 10/1 splitter, the figures representing the relative proportions of light output, ignoring inherent losses. In the drawing the shaded portion represents index matching gel, and the variable parameters are as follows $O_b$: bend angle
$R_c$: radius of curvature
$O_e$: end face angle
$O_f$: viewing angle.

Figure 1A:
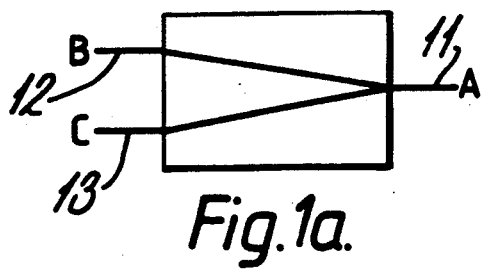
Figure 1B:
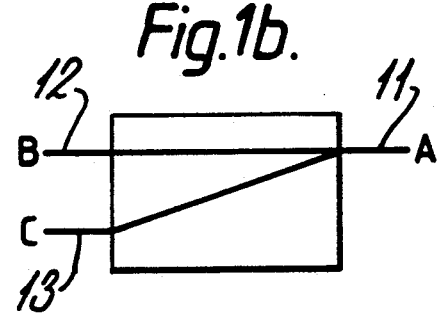

Such three port coupling devices can be used as a splitter or as a combiner, and two embodiments which can be used either way are represented as shown in FIGS. 1a and 1b. When the above variable parameters selected to give a 50/50 split as shown in FIG. 1(a), typical results are as follows:

| As a splitter | A to B | 38% |
|---|---|---|
| | A to C | 38% |
| | | 76% |

Excess loss is typically 1.2 dB.
As a combiner, inputting 100% at B and at C
B to A: 40%
C to A: 40%
(crosstalk) B to C and C to B: less than −25 dB.
When used as a 10% tap as shown in 1b, typical results are

| A to B | 73% |
|---|---|
| A to C | 7% |
| Total | 80% |

Excess loss is typically 1.0 dB.

Figure 2:
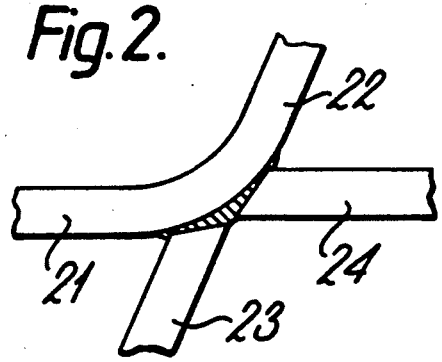
Figure 2A:
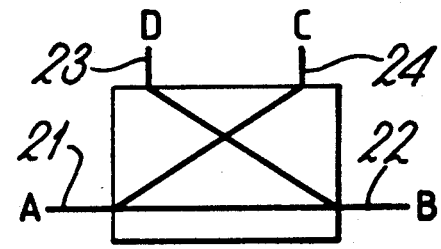

FIG. 2 shows a first fibre 21,22 and two further fibres, 23, 24 a directional four port coupler. This coupler is shown diagrammatically in FIG. 2a, typical results being as follows:

| With 100% input at A | With 100% input at D | |
|---|---|---|
| A to B 62% | D to A 0.5% | (crosstalk) |
| A to C 16% | D to B 10% | |
| A to D 0.5% (crosstalk) | D to C 1% | (crosstalk) |
| 78% | 10% | |
| excess loss = 1.1 dB | total loss = 10.0 dB. | |

Figure 3:
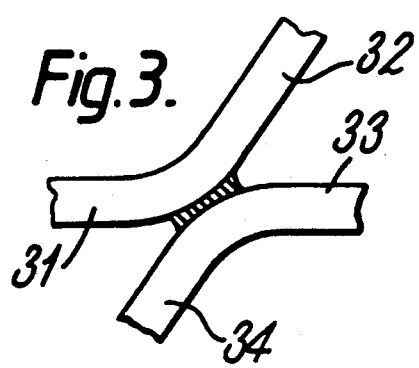
Figure 3A:
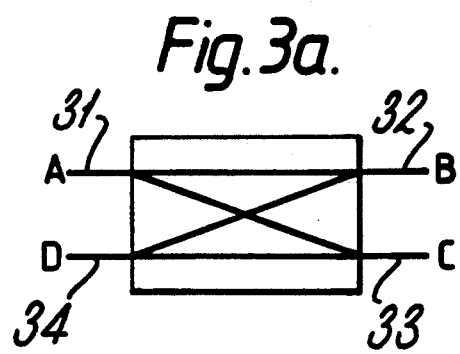

FIG. 3 shows a first fibre 31,32 and two further fibres 33,34 formed from the same fibre, held in the configuration of a transmissive star coupler. This configuration is symmetrical, there being no essential difference between the first fibre and the further fibre forming the taps. This coupler is shown diagrammatically in FIG. 3a, and has essentially the same configuration and the same effect as known star couplers designed for coupling the ends of four glass fibres, except that this is non-invasive, the two fibres being removable from the coupler without any optical deterioration, the only loss being of a short length of protective sleeve. Typical results are as follows, when 100% of light is input at A:

| A to B | 67% | |
|---|---|---|
| A to C | 5% | |
| A to D | 0.1% | (crosstalk) |
| | 72% | |
| excess loss = 1.4 dB. | | |

Figure 4:
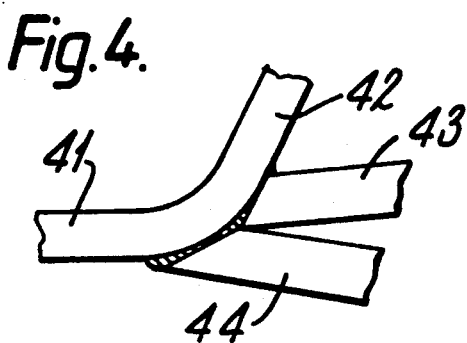
Figure 4A:
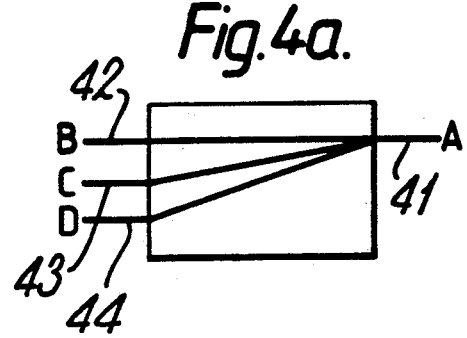

FIG. 4 shows a multiple tap, with a main fibre 41,42, and two tap fibres 43,44 positioned and aligned so that both will receive light that has approached the bend from the same direction, i.e. along portion 41 of the main fibre and not along portion 42. This is also shown diagrammatically in FIG. 4a, and it can be used as a splitter, e.g. as a demultiplexer, or as a combiner, e.g. as a multiplexer. Typical results are as follows, where each input is 100%.

| Splitter (demultiplexer) | |
|---|---|
| A to B | 40% |
| A to C | 20% |
| A to D | 20% |
| | 80% |
| excess loss = 1.0 dB. | |

| Combiner (multiplexer) | | | | |
|---|---|---|---|---|
| B to A | 40% | | C(D) to A | 20% |
| B to C | 0.35% (crosstalk) | | C(D) to B | 0.1% (crosstalk) |
| B to D | 0.35% (crosstalk) | | C(D) to D(c) | 0.1% (crosstalk) |
| | 40% | | | 20% |
| total loss = 4.0 dB | | | total loss = 7.0 dB. | |

Figure 5:
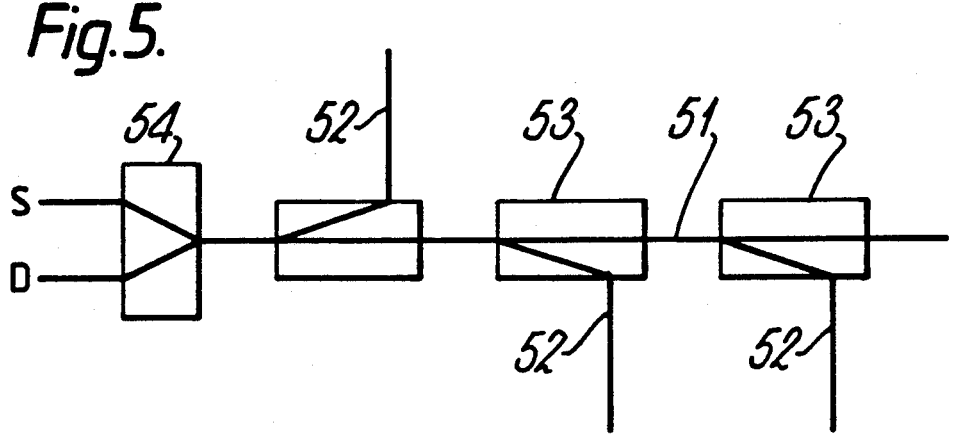

FIG. 5 shows a network comprising a single bidirectional, optical data bus 51, and a plurality of tap fibres 52, each coupled to the data bus by a three port coupling device 53 of the kind shown in FIGS. 1 and 1b. At one end of the data bus is a 50/50 splitter/combiner three port device 54, as shown in FIGS. 1 and 1a emerging as two equivalent fibres 55,56, either of which could be the first fibre or the other fibre, and either of which could similarly be referred to as part of the optical data bus or as a tap. To one is connected a light source and to the other a detector. Such a network can be used for interrogating sensors connected to the various tap fibres, for example, each sensor receiving light from the source, and modulating it according to the parameter being sensed. The modulated light is then returned through the same coupling device, and along the data bus back to the 50/50 splitter/combiner 54 which conveys about 50% of the modulated light to the detector. This loss at the end device 54 occurs in both directions. A more efficient system uses two unidirectional optical data buses, one coupled to the source and the other to the detector, with the sensors coupled in parallel.

Figure 6:
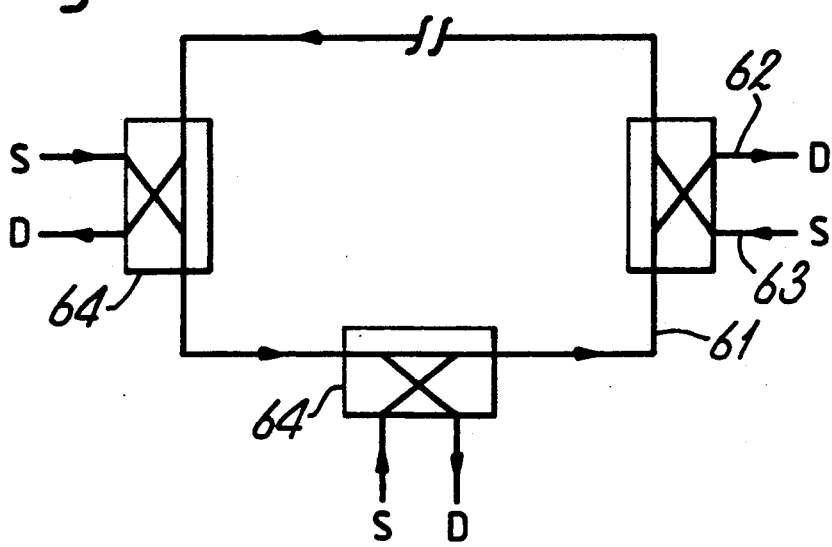

FIG. 6 shows a network particularly suitable for enabling stations of similar status to communicate with each other. The optical data bus 61 is formed as a single closed loop of optical fibre, which is non-invasively coupled via tap fibres 62,63 to the various work stations, using four port coupling devices 64 as shown in FIG. 2. The data bus is inserted into each coupling device with its cladding intact, and corresponds to reference numerals 21 and 22 of FIG. 2. The two tap fibres corresponding to reference numerals 23 and 24 are connected respectively to a light source S (having means to modulate the light according to the data to be carried) and a detector D. In each case the coupling devices are orientated such that light injected by the various sources travels anticlockwise (in the view shown in FIG. 6) around the closed loop, this also being the direction which can be picked up for transmission to the detectors.

Figure 7:
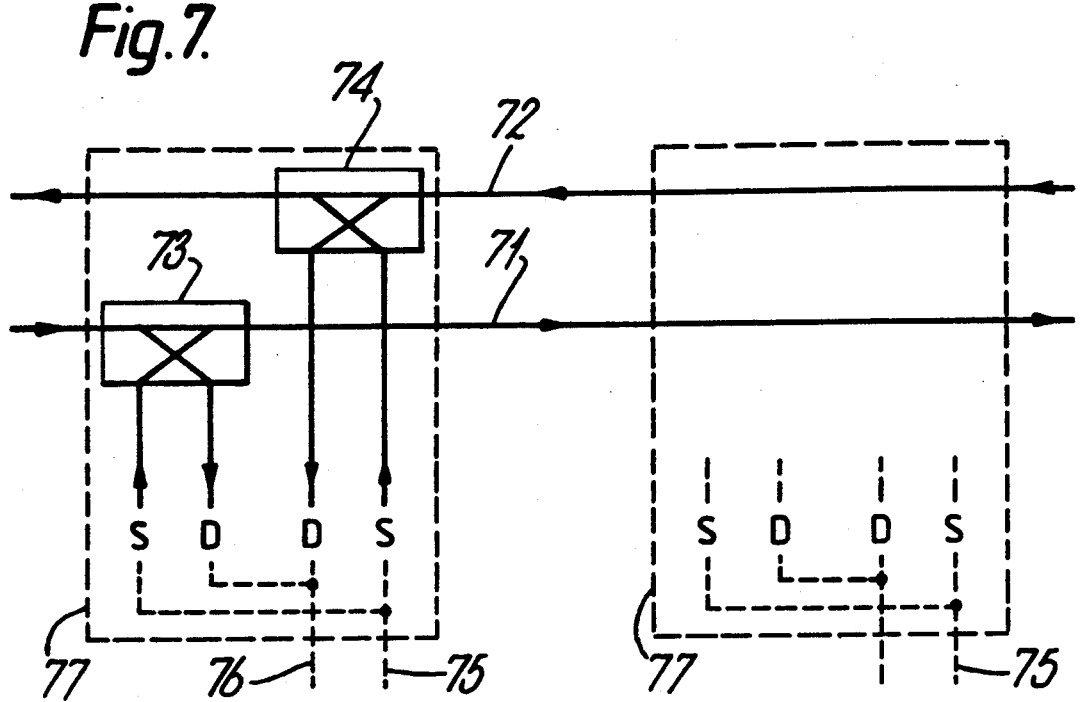

FIG. 7 shows a bidirectional data link which is again particularly suited to communication between stations of equal status. Two data buses are provided by a single duplex fibre 71,72. This requires two coupling devices 73,74, one to access the up fibre 71 and the other to access the down fibre 72, and they each operate precisely as described above for those accessing the single closed loop, each having its own source S and detector D. However, the two detectors and the two sources use a common electrical input 75 and a common electrical output 76 respectively, and are thus most conveniently formed into a single unit as indicated by the hatched line 77.

FIGS. 6 and 7 both illustrate a significant advantage over previously known invasive couplers. In the latter, where the data bus has to be broken, the ends terminated then inserted into a coupler, any malfunction occurring at any one coupler can affect the whole data bus, generally leading to a total shut down of the whole system. The present networks use non-invasive coupling devices, so the complete fibre continues through each device, and should the latter become loose or otherwise fail, the remainder of the data bus with its accessing stations can continue to function normally. Similarly additional stations can be coupled into the main fibre without interrupting service to those already in operation.

Figure 8:
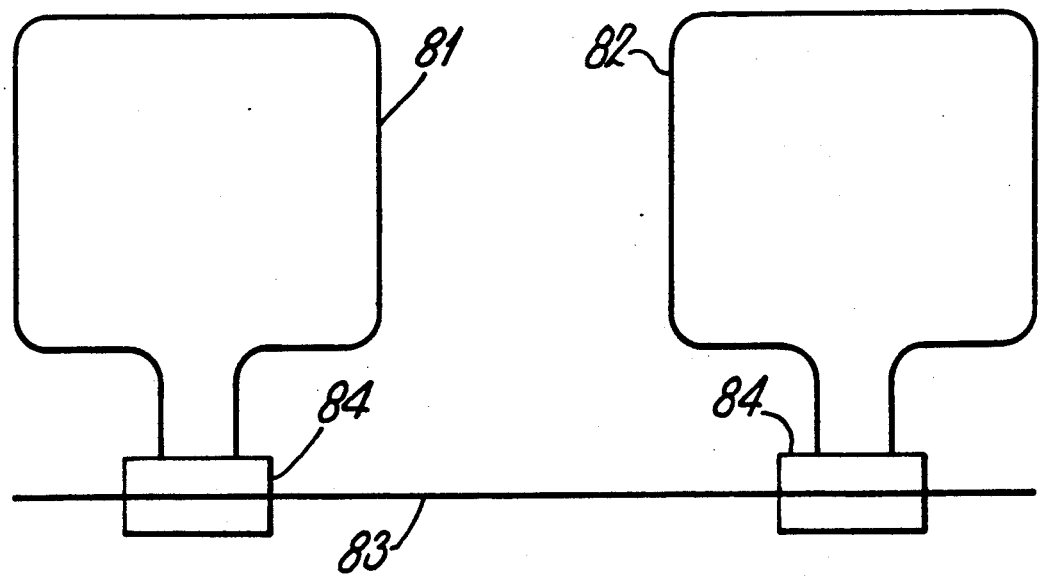

FIG. 8 shows an extension of the networks shown in FIGS. 6 and 7. The extended network comprises a plurality of open loop data buses 81,82 providing individual local area networks. These can be either a single optical fibre as in FIG. 6 or a diplex fibre as used in FIG. 7, and each has a plurality of work stations (not shown), coupled as shown in those respective drawings. Each individual network may service a single room, for example. However these individual networks are in turn coupled to a further primary data bus 83, which may service a whole floor of a building, for example. The individual networks can be coupled to the primary data bus in essentially the same manner as that described for its individual work stations, provided the data buses are of essentially the same kind. However, while we prefer to use polymer optical fibres for the individual networks, for a primary data bus of substantial length we would prefer to use glass optical fibres, as these generally give rise to lower transmission losses. For coupling such different materials we prefer to use active interfaces 84.

Figure 9:
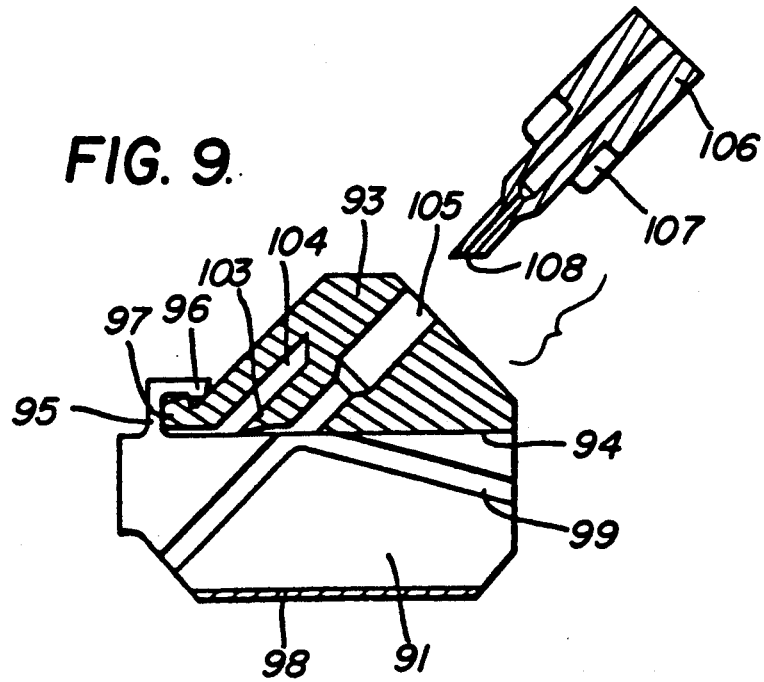
FIG. 9 is a longitudinal section through an assembled coupler with a tap plug poised for insertion.
Figure 10:
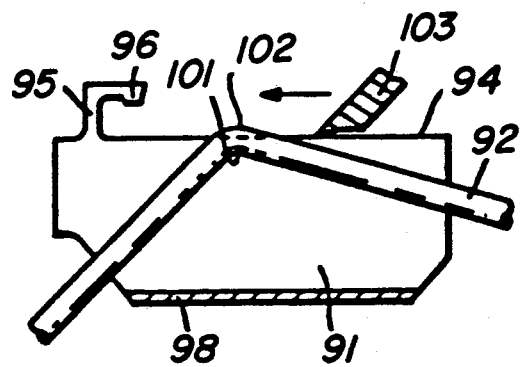
FIG. 10 shows part of the coupler of FIG. 9 holding a main fibre.

FIGS. 9 and 10 show an injection moulded three port coupler comprising a first assembly 91 for holding a first fibre 92 and a second assembly 93 for holding a tap fibre (not shown). The first assembly 91 has a mating surface 94 with two longitudinal under cut ridges and the second assembly 93 is correspondingly shaped with grooves (not shown) to receive the ridges and enable one to slide along the other while holding the second assembly 93 against the mating of the first 91. At one end is an end stop 95 with an integral resilient latch 96, such that when the second assembly 93 is slid along the first until it abuts the end stop 95, the latch 96 on the latter engages a latching recess 97 on the former, and thereby locks the two assemblies 91 and 93 together.

The first assembly is split longitudinally with an integral hinge 98 along one edge. In one part is a channel 99 to receive the optical fibre 92, and the other part locks against it to hold the fibre securely in place. The channel 99 has two straight portions meeting an angle at the mating surface 94. The fibre 92 is shown only in FIG. 4, and this has been provided to show how the fibre 92 (complete with its protective sheath is held by the channel 99 with a tight bend 103, the protective sheath 102 around the bend extending above the mating surface 94. In the second assembly 93 there is also formed an integral stripping blade 103 (shown in isolation in FIG. 4) which slides along the mating surface 94 during assembly of the coupler and strips the protective sheath 102 from the fibre 92 around the bend, so as to expose the cladding. Ahead of the blade 103 is a recess 104 to receive the stripped sheath material.

The second assembly 93 has a passage 105 drilled through it an angle, parallel to one of the arms of the channel 99 in the first assembly 91, the two being very nearly coaxial, as shown in FIG. 3. The passage 105 is drilled to receive a plug 106 of varying diameter (this being a third plastic moulding), which in turn is drilled to receive a tap fibre (not shown) with its sheath removed from its end portion to fit the plug. Extending on both sides of the plug 106 are latching plates 107 which, when the plug 106 is inserted into the assembly 93, lie on either side of the latter, locking the plug 106 into position and preventing it rotating. The narrow end of the plug 106 has a slanting end face 108, and the tap fibre is shaped to lie flush with this. When the plug 106 is located in the assembly 93, it hold its end face and hence also the end of the tap fibre against the exposed cladding of the first fibre 92.

We claim:

1. A fibre optic data network comprising a plurality of optical fibres, each comprising a core surrounded by cladding of lower refractive index and having a protective layer surrounding the cladding and a plurality of coupling devices associated with the fibres to couple them optically into the network configuration, each coupling device comprising means to hold an intermediate portion of a first optical fibre with its cladding intact and to conform it to a predetermined path which executes a bend having a radius of curvature sufficiently small to cause some of any light flowing through the first fibre to leak from the cladding around the outer edge of the bend, and means to hold at least one further optical fibre with a light receptive portion positioned to receive at least a portion of the light leaking from the cladding around the outer edge to the bend being arranged to hold said further fibre with the light-receptive portion thereof substantially aligned with the longitudinal axis of the portion of the first fibre preceding the bend, the extent of any displacement from alignment being no greater than the diameter of the first fibre, said means to hold the intermediate portion comprising a first assembly having a mating surface positioned with respect to said predetermined path such that the cladding on the outer surface of the bend in the first fibre lies flush with the mating surface, and the means for holding at least one further fibre comprising a second assembly lockable against the mating surface in a predetermined position wherein the light receptive portion of the at least one further fibre is positioned to receive at least a portion of the light leaking from the cladding around the outer surface of the bend in the first fibre, and including a stripping means fixed to the second assembly, which stripping means can be slid along the mating surface for stripping a portion of the protective layer from the outer surface of the bend which extends above the mating surface to expose the cladding as the second assembly is moved to its lockable position.

2. A fibre optic data network as claimed in claim 1 which comprises at least one element consisting essentially of a plurality of the fibres each of which is associated with a first coupling device as the said first fibre and with a second coupling device as a said further fibre, thereby to provide a network configuration of an optical data bus with a plurality of tap fibres extending from the data bus.

3. A fibre optic data network as claimed in claim 1 wherein the said first fibre has a plurality of further fibres each optically coupled to it by a separate one of said coupling devices thereby to provide a network configuration of an optical data bus with a plurality of tap fibres extending from it.

4. A fibre optic data network as claimed in any one of the preceding claims wherein at least one of the coupling devices optically couples a first fibre held in a bend configuration, and a further fibre whose light receptive portion is in the form of an exposed end face held adjacent to the outer surface of the bend in the first fibre to enable it to receive light leaking from the bend when light is passed through the first fibre.

5. A fibre optic data network as claimed in claim 1, 2 or 3 claims wherein at least one of the coupling devices is a four way coupler comprising means to hold two of said further fibres with their exposed end faces adjacent to the outer surface of the bend in the first fibre but positioned substantially symmetrically with respect to said bend thereby to enable each of said further fibres to receive light travelling along the first fibre in the opposite direction to that received by the other of said further fibres.

6. A fibre optic data network as claimed in claim 1, 2 or 3 wherein at least one of the coupling devices is designed to cause an intermediate portion of the further fibre to conform to a predetermined path which executes a bend having a radius of curvature sufficiently small to cause some of any light flowing through the fibre to leak from the cladding around the outer edge of the bend, and to hold adjacent to each other the outer edges of the bends in the two fibres whereby light leaked from one fibre can be caught by the other.

7. A fibre optic data network as claimed in claim 1, 2 or 3 in which both the first fibre and the one or more further fibres passing through each coupling device are polymer optical fibres.

8. A fibre optic data network as claimed in claim 7 when linked to at least one other such network by one or more optical fibres which are other than polymer optical fibres, the one or more linking fibres being coupled to the polymer optical fibre networks using active interfaces.

9. A fibre optic data network as claimed in claim 2 or claim 3 wherein the data bus is in the form of a closed loop.

* * * * *